Oct. 25, 1927.  
I. A. WEAVER ET AL  
TIRE CHANGER  
Filed March 23, 1925  
1,646,511
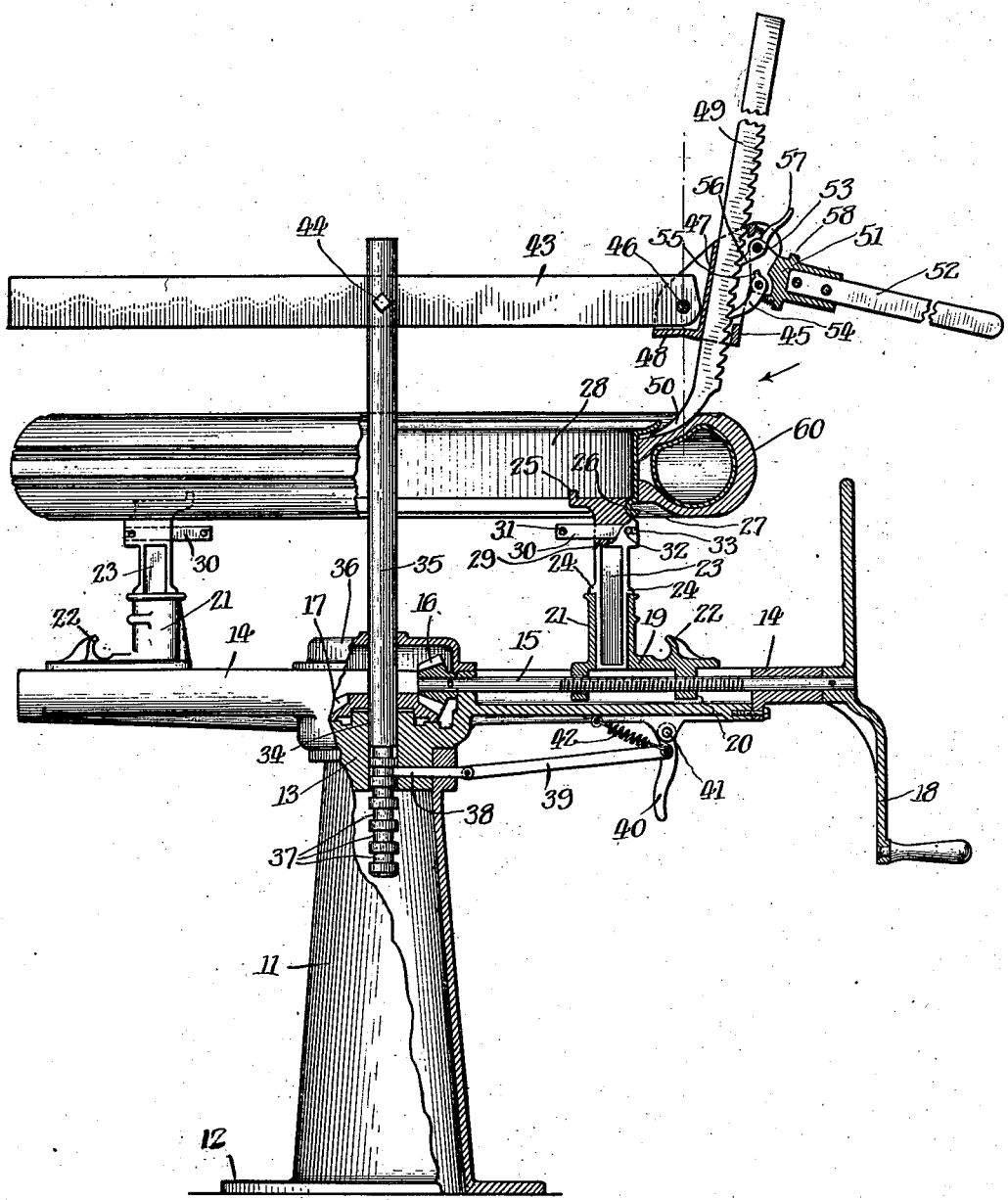

Patented Oct. 25, 1927.

1,646,511

UNITED STATES PATENT OFFICE.

IRA A. WEAVER AND JOHN STERNAMAN, OF SPRINGFIELD, ILLINOIS, ASSIGNORS TO WEAVER MANUFACTURING COMPANY, OF SPRINGFIELD, ILLINOIS, A CORPORATION OF ILLINOIS.

TIRE CHANGER.

Application filed March 23, 1925. Serial No. 17,461.

Our invention has reference to novel features of construction and improved modes of operation in tire-changing appliances, particularly, but not restrictedly, those constructed to accommodate vehicle wheel rims and their tires of different diameters and widths and designed and intended to facilitate the otherwise more or less difficult feat of quickly and efficiently removing such tires from their rims even though "frozen" or adhered or rusted thereto.

One purpose of the invention is to provide a powerful structure which will exert adequate force during the tire demounting operation but which will not at the same time tend to injure or damage the side walls or other parts of the tire undergoing treatment.

Another aim of the invention is the provision of simple means which permit the application of the rim to and its removal from the machine with ease and dispatch.

An additional object of the invention is the production of a machine of this character which will hold the rim and tire sufficiently elevated so that the latter may be removed downwardly by depression of an appropriate operating handle.

Another salient feature of the invention is a machine of this style which is simple in structure, economical to manufacture, effective in results, and unlikely to become damaged or injured in ordinary service.

To the accomplishment of these and other desirable aims, we have produced the preferred embodiment of the invention illustrated in the accompanying drawing, the single view of which represents an elevation of the machine and the associated tire and rim with certain portions shown in section to more clearly illustrate the construction.

The present improved machine, as will be seen by reference to this drawing, includes an upwardly-tapering, hollow standard 11 with a base 12 of adequate size to rest upon the floor.

In the open, round, top end of such support and resting or bearing on its upper annular face, we mount the hub or central portion 13 of a three-arm spider 14, two only of its arms being depicted in the drawing, this style and form of structure being well and favorably known in the art.

Each such arm of the spider is hollow and open along its top and each has bearings for a screw-threaded shaft 15 positioned within and longitudinally of the arm, as is clearly shown, and each such shaft, at its inner end, carries a bevel-pinion 16, all three of which are in mesh with a common, central bevel-gear 17 having an appropriate bearing or support on the top of the hub 13.

Thus the turning of any shaft 15 will cause the simultaneous and equal rotary movement of the other connected shafts.

For the ready manual accomplishment of this function, one such shaft is made somewhat longer than the companion ones and is equipped at its protruding end with a suitable operating handle 18.

Slidable on the top face of each such spider-arm is a rim clamp or jaw 19 having within the spider-arm one or more depending ears or lugs 20 with threaded engagement with the corresponding screw-threaded jaw-actuating shaft 15.

The upstanding, hollow portions 21 of such jaws are constructed to engage the inner face of a rim, and, by their conjoint and simultaneous, outward, radial travel, occasioned by the turning of handle 18, to expand the rim during a tire-applying operation to a transversely-split rim.

Each such jaw also has an inwardly-facing hook 22 designed to co-operate with the lower flange of a similar rim and these several hooks by their concurrent, converging, inward-movement contract the rim to permit the tire to be removed therefrom.

The structure so far described is not new and is well known in the industry.

The new features reside in the elements and combinations of parts about to be described.

The rectangular, upright passage or hole through each jaw section 21 is designed and adapted to demountably or detachably receive the lower end of a similarly-shaped, upstanding, supplemental jaw 23 having lateral shoulders 24 to bear on the top edge of the part 21 to support the element 23 in correct position, each such auxiliary jaw at its top having a lug or ear 25 and in its outer face a recess or groove 26 adapted to accommodate the internal ring bead or rim rib 27 of a vehicle wheel rim 28.

Each such jaw member 23, near its top end, has a transverse slot 29 therethrough forming a bearing for a sliding secondary or auxiliary rim-supporting bar 30 designed and intended at times to be projected outwardly beyond the outer face of the jaw element 23 to assist in temporarily supporting the rim and tire before the former is clamped by the upstanding jaws, as indicated in the drawing.

Each slidable or projectable bar 30 has a cross pin 31 through its inner end to limit its outward movement by striking against the adjacent face of the member in which it is mounted, and, conversely, the outer end of the bar has a like cross stop-pin 32 adapted when the bar is pushed inwardly into retracted or inoperative position to travel in short, horizontal grooves 33 in the jaw member and by striking their inner walls limit or restrict such movement with the outer end of the bar contained within its bearing in the jaw member.

The hub 13 has a vertical, central bearing 34 for an upright shaft 35, the gear 17 and the cover-plate 36 for the gearing having suitable registering apertures for the shaft, as is fully indicated in the drawing.

On its lower portion, such shaft has a plurality of vertically-spaced, circumferential grooves or channels 37 any one of which, when in proper position, may receive the end part of a sliding locking-bolt 38 to hold the shaft at the desired or required elevation, but without interfering with its capacity for rotation.

A link 39 connects the outer end of the locking-bolt with a handle 40 fulcrumed on one of the spider-arms at 41 and fitted with a coiled, contractile spring 42 connected thereto and to the corresponding spider-arm, thus tending always to project the bolt into and maintain it in one of the shaft channels or grooves.

When the handle 40 is swung upwardly and outwardly until it strikes the under face of the spider-arm, this spring passes beyond the center or fulcrum 41 and holds the locking-bar thus retracted until the handle is again rocked down.

Near its top end, shaft 35 is transversely slotted to receive a horizontal bar 43 which may be held in adjusted position in the slot of the shaft by a set-screw 44 or other appropriate means, although, as a matter of fact, in some cases, no such holding or confining means is required.

At one end of bar 43, a hollow casting 45 of the form shown is fulcrumed or hinged at 46, the two walls 47 and 48 of the casting limiting the rocking movement thereof in opposite directions by engagement with the end and bottom faces of the bar respectively.

Such member 45 has a bearing in which a ratchet-bar 49 is slidable upwardly and downwardly, the lower end of such ratchet-bar being tapered and curved inwardly to form a foot or tool 50 to perform the tire-removing operation.

A handle socket member 51, equipped with an operating handle 52, is rockingly mounted on the casting 45 at 53 and it is supplied with a spring-pressed, pivoted pawl or dog 54 for the purpose of actuating the ratchet-bar downwardly, the pawl having an upstanding tail or lug 55.

On the fulcrum or hinge pin of the socket element 51, a spring-controlled holding pawl 56 is provided to co-operate with the teeth of the ratchet-bar, such pawl having an upwardly-directed finger or lug 57 in the path of upward rocking travel of a lug 58 on element 51.

In case the jaws 19 only are to be used in contracting or expanding the rim, the shaft 35, bar 43 and secondary jaws 23 and the parts which they carry are taken off of the machine and the latter is used in the customary way without them.

Assuming that these parts are to be employed in demounting the tire from its rim, then bar 43 and the mechanism mounted thereon are removed from the shaft 35, and, if the latter is in the way, it is also taken off to facilitate the placing of the rim and its tire on the machine.

In both instances, it is, of course, necessary to retract or withdraw the lock 38 from the shaft groove by actuation of handle 40 to permit the upward withdrawal of the shaft.

Then the slidable supports 30, 30 are pushed out to project beyond the outer faces of the upper jaws, whereupon the rim 28 and its tire 60 are applied to the machine and caused to rest on these supports.

Thereupon the handle 18 is turned to expand the jaws and the internal rim bead 27 is received in the external grooves 26 of the jaws causing the rim and tire to be supported independently of the elements 30 which are then pushed in out of the way.

The shaft 35, if it had previously been taken out, and the bar 43 and its associated elements are applied to the machine and the shaft locked at a proper height to position the bar and its members in correct relation to the rim and tire with the hinge or fulcrum pin 46 located outwardly beyond the outer face of the rim, as shown, for example, in the drawing.

Then the operator by pressing down on the handle forces the ratchet-bar and its curved foot or tool in the same general direction through the action of the pawl 54, the foot or tool traveling not only downwardly but also inwardly between the tire and the rim, the rocking action of casting 45 being limited by its engagement with the under face of bar 43.

After the tool strikes the outer surface of the rim, it moves downwardly only but is at the same time held firmly pressed against the rim on which it slides, so that the tire is freed from the rim at its base without possibility of injuring the side walls of the tire.

Owing to the leverage involved, a powerful downward pressure is exerted without undue effort on the part of the operator.

Having thus rocked the handle down, the workman then swings it upwardly to get a new hold on the tool but such ratchet equipped element is prevented from springing back from the work by the holding-pawl 56, all as will be readily understood.

Thus the handle is rocked up and down the required number of times at any one point to free or partially release the tire from the rim progressively or step by step at that place, whereupon the handle is swung upwardly to its full limit of movement, thus bringing the wall 47 against the adjacent end of bar 43, releasing the upper holding-pawl 56 from the teeth of the ratchet-bar by the engagement of the projection 58 on the handle socket member 51 with its tail 57, and also rendering the lower actuating pawl or dog 54 inoperative on the ratchet-bar which is prevented from coacting with the latter by reason of its lug or tail 55 being struck by the adjoining wall or inner surface of member 51.

The ratchet tool, thus temporarily rendered independent of its two pawls, may be lifted by hand, and while thus held raised, the handle 52 is swung around the axis of the rim to bring the tool to a new field of action on the tire where the above-specified operation is repeated.

This mode of operation is continued at different points on the tire until it is wholly freed from the rim and drops down away therefrom.

Then, by demounting the bar 43 and its appurtenances, and the upright shaft 35, if this is required, the rim and the tire may be easily taken off of the machine separately.

This invention, of the scope defined by the appended claims, is obviously not limited and confined to the exact details of structure shown and described and the machine as a whole and its various parts may be modified in more or less radical manner without departure from the invention and its various accruing structural and functional advantages.

We claim:

1. In a tire-changer, the combination of a support, main rim-clamping jaws on said support, means to expand and contract said jaws, supplemental rim-clamping jaws movable with said main jaws and designed to clamp a rim in a position different from one clamped by said main jaws, and means to remove a tire from a rim while the latter is clamped by said supplemental jaws.

2. In a tire-changer, the combination of a support, main rim-clamping jaws on said support, means to expand and contract said jaws, supplemental rim-clamping jaws demountably supported on and adapted to move with said main jaws and designed to clamp a rim in a position different from one clamped by said main jaws, and means to remove a tire from a rim while the latter is clamped by said supplemental jaws.

3. In a tire-changer, the combination of a support, main rim-clamping jaws on said support, means to expand and contract said jaws, supplemental rim-clamping jaws movable with said main jaws and adapted to clamp a rim at a higher position than said main jaws, means to remove a tire from a rim held by said supplemental jaws, and supports constructed to be projected outwardly beyond said supplemental jaws to support a rim preliminary to the clamping thereof by said supplemental jaws and to be retracted into inoperative position to permit downward removal of the tire from the rim.

4. In a tire-changer, the combination of a support, main rim-clamping jaws on said support, means to expand and contract said jaws, supplemental rim-clamping jaws demountably supported on and movable with said main jaws and adapted to clamp a rim at a higher position than said main jaws, means to remove a tire from a rim held by said supplemental jaws and supports on said supplemental jaws constructed to be projected outwardly beyond said supplemental jaws to support a rim preliminary to the clamping thereof by said supplemental jaws and to be retracted into inoperative position to permit downward removal of the tire from the supported rim.

5. In a tire-changer, the combination of a support, main rim-clamping jaws on said support, means to expand and contract said jaws, supplemental rim-clamping jaws demountably supported on and movable with said main jaws and adapted to clamp a rim at a higher position than said main jaws, said supplemental jaws having recesses on their outer faces to receive a bead on the inner portion of the rim, means to remove a tire downwardly from a rim held by said supplemental jaws, and supports on said supplemental jaws constructed to be projected outwardly beyond said supplemental jaws to support a rim preliminary to the clamping thereof by said supplemental jaws and to be retracted into inoperative position to permit downward removal of the tire from the rim.

6. In a tire-changer, the combination of a support, main radially-movable rim-clamping jaws on said support, means to expand or contract said jaws simultaneously, supplemental rim-clamping jaws demountably supported on said main jaws and having recesses in their outer faces to accommodate a rib on the inner face of a rim, means to remove a tire from a rim supported by said supplemental jaws, and supports mounted on said supplemental jaws constructed to be projected outwardly beyond said jaws to support a rim preliminary to the clamping thereof by such jaws and to be retracted into inoperative position to permit the downward removal of the tire from the rim.

7. In a tire-changer, the combination of means to support a rim and its tire, and means to force the tire from the rim including a member hinged outwardly beyond the supported rim, a tire-tool movably mounted with relation to said hinge member and means to operate said tire-tool carried by said member, said supporting and forcing means being relatively revoluble.

8. In a tire-changer, the combination of means to support a rim and its tire, an arm revoluble about the axis of the rim and tire, means to adjust said arm to different distances from said rim and tire supporting means, and means to force the tire from the rim including a member hinged to said arm outwardly beyond the supported rim, a tire-tool movably mounted with relation to said hinged member and means to operate said tire-tool carried by said member.

9. In a tire-changer, the combination of means to support a rim and its tire, a shaft disposed axially of said supporting means, an arm outstanding radially from said shaft, said arm and said supporting means being relatively revoluble, a ratchet-bar slidably mounted on said arm carrying a tire-tool, a rockable handle, an actuating pawl operated by said handle and coacting with said ratchet-bar to feed the latter and the tire-tool toward the supported tire, and a holding-pawl to prevent retraction of the ratchet-bar and tire-tool when the actuating pawl is drawn back to engage another tooth of the ratchet-bar.

10. In a tire-changer, the combination of means to support a rim and its tire, and means to force the tire from the rim including a hinged member, a support therefor, a tire-tool on said member, an operating-handle for the tool fulcrumed on said member, a ratchet associated with said tool, a tool-actuating pawl coacting with said ratchet and operated by the movements of said handle and a holding-pawl co-operating with said ratchet.

11. In a tire-changer, the combination of means to support a rim and its tire, and means to force the tire from the rim including a hinged member, a support therefor, a ratchet-bar slidingly mounted in said member, a tire-tool actuated by said ratchet member, an operating handle rockingly mounted on said member, an actuating-pawl co-operating with said ratchet-bar and moved by said handle, a holding-pawl co-operating with said ratchet-bar, and means to limit the rocking movement of said member toward the tire.

12. In a tire-changer, the combination of means to support a rim and its tire, and means to force the tire from the rim, said two means being relatively revoluble, said tire-forcing means including a support, a member hinged thereto at a point beyond the rim, a ratchet-bar slidable in said member and carrying a bent tire-tool, a handle fulcrumed on said hinged member, an actuating-pawl operated by said handle and co-operating with said ratchet-bar, and a holding-pawl coacting with said ratchet-bar.

13. In a tire-changer, the combination of means to support a rim and its tire, a shaft disposed axially of said supporting means, a radial arm on said shaft, a member hinged to said arm, a ratchet-bar slidable in said member, a tire-tool carried by said ratchet-bar, the hinge of said member being located outwardly beyond the tire-engaging end of the tool, an operating-handle fulcrumed on said member, an actuating-pawl co-operating with said ratchet-bar and operated by said handle, a holding-pawl coacting with said ratchet-bar, means to limit the turning of said member toward the tire, and means whereby the handle may retract both pawls from the ratchet-bar.

14. In a tire-changer, the combination of a standard, a plurality of radially-movable rim-clamping jaws thereon, means to expand said jaws simultaneously to clamp a rim and its tire, a revoluble shaft disposed axially of said jaws having a plurality of spaced circumferential grooves, a locking bolt adapted to enter any one of said grooves to maintain the shaft in the desired position of adjustment without interfering with its capacity for rotation, a radial arm on said shaft adjustable radially thereof, a member hinged on said arm, stops to limit the turning of said member on its hinge in both directions, a ratchet-bar slidable in said member toward and from the supported tire, a tire-tool carried by said ratchet-bar, a handle fulcrumed on said member, an actuating-pawl co-operating with said ratchet-bar and operated by said handle, a holding-pawl coacting with said ratchet-bar, and means whereby said handle may retract both pawls from the ratchet-bar.

IRA A. WEAVER.
JOHN STERNAMAN.